UNITED STATES PATENT OFFICE.

WILLIAM KIEL, OF BUTLER, NEW JERSEY, ASSIGNOR TO KIEL, BUTLER & TURNBULL, OF NEW YORK, N. Y.

PROCESS OF MANUFACTURING VULCANIZED PLASTIC COMPOUNDS.

SPECIFICATION forming part of Letters Patent No. 412,268, dated October 8, 1889.

Application filed January 19, 1889. Serial No. 296,921. (Specimens.)

*To all whom it may concern:*

Be it known that I, WILLIAM KIEL, a citizen of the United States, residing at Butler, in the county of Morris, in the State of New Jersey, have invented an improved process of manufacturing vulcanized plastic compounds into which wood enters as an ingredient in large quantities, (for which compounds I have filed simultaneously herewith an application for Letters Patent,) of which the following is a specification.

My new process enables me to produce very superior vulcanized plastic compounds, which if vulcanized so as to produce a hard substance can be used to great advantage in the place of hard rubber, whalebone, ivory, and even wood, and which if vulcanized so as to produce a soft substance can be used to take the place of soft rubber and its compounds, and which possess in each case very superior qualities.

My invention consists in the following process: I mix wood with oil, sulphur, and crude rubber in any proportions. I vulcanize this mixture until I obtain an uneven, brittle, hard mass. This mass, by grinding or other similar processes, I reduce to a powder, and I then combine this product with sulphur, oil, and crude rubber on heated rollers, and thus obtain a compound which is ready for vulcanization. I may add a small quantity of beeswax to this compound, as it tends to toughen the vulcanized product. I preferably use in each case crude rubber which has been washed and dried.

For the purpose of preparing the hard mass which I subsequently reduce to a powder, I saw or otherwise convert the wood into some convenient form, and from the particles of wood I remove all moisture by artificial or other means, and, if necessary, wash out any acids that may be in them.

The proportions of the ingredients and the time of vulcanization of the compound obtained by the application of my new process and the pressure vary according to the nature of flexibility and hardness of the finished vulcanized material to be produced. Longer vulcanization produces a hard substance and shorter vulcanization a soft substance.

I do not claim the finished vulcanized plastic compounds which are the product of the herein-described process, as I have filed simultaneously herewith an application for Letters Patent for those compounds, and I do not limit myself to any particular proportions, as I may vary them as occasion may require; but What I do claim, and desire to secure by Letters Patent, is—

1. The herein-described process of manufacturing vulcanized plastic compounds of which wood is a constituent part by vulcanizing to a hard state wood, sulphur, oil, and crude rubber, and subsequently combining the product thus obtained, reduced to a powder or dust, with sulphur, oil, and crude rubber, substantially as described.

2. The herein-described process of manufacturing vulcanized plastic compounds of which wood is a constituent part, consisting in vulcanizing to a hard state wood, sulphur, oil, and crude rubber, and subsequently combining the product thus obtained, reduced to a powder or dust, with sulphur, oil, beeswax, and crude rubber, substantially as described.

WILLIAM KIEL.

Witnesses:
SHERMAN EVARTS,
THOMAS HUNT.